(12) United States Patent
Suzuki

(10) Patent No.: US 7,848,611 B2
(45) Date of Patent: Dec. 7, 2010

(54) STORAGE SYSTEM AND DIGITAL BROADCASTING SYSTEM

(75) Inventor: Katsuyoshi Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1558 days.

(21) Appl. No.: 11/171,271

(22) Filed: Jul. 1, 2005

(65) Prior Publication Data
US 2006/0238809 A1 Oct. 26, 2006

(30) Foreign Application Priority Data
Apr. 22, 2005 (JP) ............................ 2005-124424

(51) Int. Cl.
G11B 27/00 (2006.01)
H04N 5/93 (2006.01)
G06F 7/00 (2006.01)
G06F 17/00 (2006.01)

(52) U.S. Cl. .................... 386/52; 386/125; 386/126; 707/661; 707/674

(58) Field of Classification Search .......... 386/125, 386/126, 52; 707/200, 201, 204, 205, 661, 707/674, 790
See application file for complete search history.

(56) References Cited
U.S. PATENT DOCUMENTS
5,784,646 A * 7/1998 Sawada ............... 710/38
6,272,088 B1 * 8/2001 Aramaki et al. ......... 369/53.24
2001/0013130 A1 * 8/2001 Shimizu et al. ............ 725/91

FOREIGN PATENT DOCUMENTS
JP 2001-313620 2/2001

* cited by examiner

Primary Examiner—Thai Tran
Assistant Examiner—Hung Q Dang
(74) Attorney, Agent, or Firm—Foley & Lardner, LLP

(57) ABSTRACT

A digital broadcasting system is provided, in which an editing storage connected to plural digital image editing apparatuses can be managed as a virtual storage in a collective manner and an editing storage connected to other digital image editing apparatuses can be handled as the editing storage connected to the digital image editing apparatus. The digital broadcasting system includes a digital image editing apparatus, a storage system having an editing storage and a management storage, and a sending apparatus, wherein a first access path from the digital image editing apparatus to the editing storage and a second access path from the digital image editing apparatus through a virtual storage in the management storage are provided as access paths to the digital image data stored in the editing storage, and the access through the first and second access paths is controlled based on the use of the editing storage.

7 Claims, 7 Drawing Sheets

FIG. 5

| | EDITING APPARATUS SIDE | | VIRTUAL STORAGE SIDE |
|---|---|---|---|
| OBJECT LU | LU0 | LU1 | LU1 |
| STATUS | EDITING | SYNCHRONOUS STATE | Read Only |

| | EDITING APPARATUS SIDE | | VIRTUAL STORAGE SIDE |
|---|---|---|---|
| OBJECT LU | LU0 | LU1 | LU1 |
| STATUS | EDITING | ASYNCHRONOUS STATE | Read / Write(Read) |

| | EDITING APPARATUS SIDE | | VIRTUAL STORAGE SIDE |
|---|---|---|---|
| OBJECT LU | LU0 | LU1 | LU1 |
| STATUS | EDITING | ASYNCHRONOUS STATE | Read / Write(Wtite) |

| | EDITING APPARATUS SIDE | | VIRTUAL STORAGE SIDE |
|---|---|---|---|
| OBJECT LU | LU0 | LU1 | LU1 |
| STATUS | NON-EDITING | ASYNCHRONOUS STATE | Read / Write(Write) |

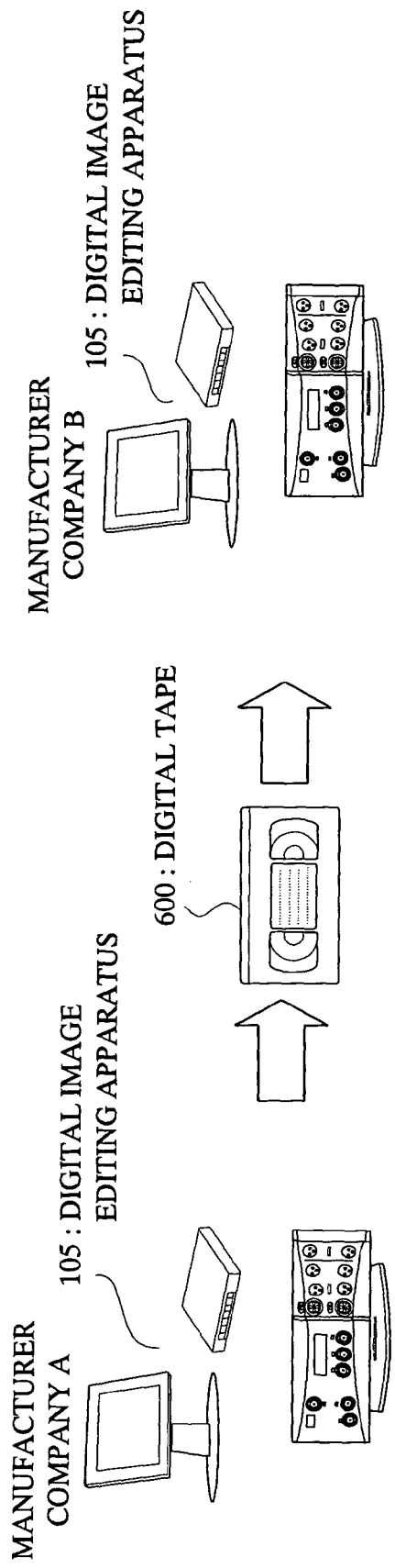

STORAGE SYSTEM AND DIGITAL BROADCASTING SYSTEM

CROSS-REFERENCE TO RELATED APPLICATION

The present application claims priority from Japanese Patent Application NO. JP2005-124424 filed on Apr. 22, 2005, the content of which is hereby incorporated by reference into this application.

TECHNICAL FIELD OF THE INVENTION

The present invention relates to a storage system and a digital broadcasting system. More particularly, it relates to a technology which provides the configuration of a storage in which digital data is stored, an interface, sharing means, management means, and sending means.

BACKGROUND OF THE INVENTION

In recent years, the digitalization of the broadcasting system by the NLE (nonlinear editing) system has been promoted. In such a circumstance, the amount of digital data also tends to increase along with the increase of the image for high-definition TV. Taking MPEG-2 data as an example, data bit rates not lower than 100 Mbps is required to improve the quality of the digital data, whereas the data bit rate ranges from 4 to 8 Mbps in the commercially available DVD-video image.

Namely, since the data amount becomes ten times or more in terms of the disk capacity, the improvement of a data transfer rate is important also on the storage apparatus side.

For example, a system disclosed in Japanese Patent Laid-Open Publication No. 2001-313620 is reported as a publicly-known digital broadcasting system.

As shown in Japanese Patent Laid-Open Publication No. 2001-313620, the digital broadcasting system generally includes an authoring apparatus (editing apparatus) and a sending apparatus, and the editing apparatus includes an authoring unit which performs authoring and a content storage unit in which contents formed in digital data are stored.

The authoring unit includes an editing control device, a server and the like which are unique to each manufacturer. Usually, a storage apparatus is used as the content storage unit. In Japanese Patent Laid-Open Publication No. 2001-313620, one dedicated storage apparatus with the single configuration is used. The storage apparatus has high-speed RAID configuration or a high-speed interface such as a fiber channel interface and iSCSI, because a high I/O rate is required for data I/O between an authoring unit and storage apparatus.

In another well-known digital broadcasting system, plural editing apparatuses are connected to one storage apparatus in SAN environment to share the file. In the file sharing, an exclusive process is adopted so that other editing apparatuses cannot access the file when one editing apparatus is accessing the file which is of an editing object.

In still another well-known digital broadcasting system, the file sharing by use of an IP network is reported.

As described above, in the digital broadcasting system, the needs for sharing the digital data with the plural editing apparatuses have been grown, and the means for sharing the digital data has been reported.

SUMMARY OF THE INVENTION

In the technology described in Japanese Patent Laid-Open Publication No. 2001-313620, when using one storage apparatus, the editing work using the plural digital broadcasting systems cannot be performed due to the single configuration. Therefore, in order to perform the editing with the plural digital broadcasting systems, technologies such as file sharing are required. However, the current digital broadcasting system has problems to be solved such as a file sharing method, prevention of frame dropping, and prevention of image quality degradation. The frame dropping and the image quality degradation can be prevented by sufficiently securing transfer performance in the file sharing environment.

The conventional system in which one storage apparatus is shared with the plural editing apparatuses in the SAN environment has the problem that there is the restriction in a distance between the editing apparatus and the storage apparatus in the SAN environment.

For example, although the connection using only the fiber channel can be made if it is in the same floor, the connection cannot actually be made due to the connection distance restriction of the fiber cable when the storage apparatus is shared with the editing apparatus located on the adjacent building.

With respect to the technology for sharing storage apparatuses located at a remote site, the method of sharing the files through an IP network is studied and reported.

However, currently the technology capable of transferring the data at the transfer rate of about 100 Mbps with no transfer delay is not established yet in the IP network. Although there are many reports in an experimental level, the dedicated line and expensive dedicated apparatus are required for the data transfer rate of about 100 Mbps in the current IP network, and many troubles occur if some kind of fault is caused.

The prime problem in the IP network is that sometimes the data transfer is not fully completed and the data is not appropriately stored in some file system environment when some kind of fault occurs in the line even if the image capturing of 99 minutes of 100 minutes is completed.

In the case where the image data is captured from digital tape, the actual recording time is required. Therefore, the line fault while capturing the data becomes fatal. In the case where an alternate path is formed through the fiber channel to capture the data, the data can be captured through the alternate path even if the fault occurs in the other fiber channel, so that the problem is not caused.

As described above, for the practical use, the conventional IP network technology has the problems to be solved.

Therefore, from the viewpoint of performance maintenance, in some editing apparatus, the capture to the IP storage is prohibited by software.

Another problem of the digital image editing apparatus is that the digital image editing apparatus adopts an original digital data format during a process of digitizing the data so that each manufacturer of the digital editing apparatus can increase the editing process speed. This is because high-speed process is realized by using a record length and a data structure depending on the hardware, the software, and the process method of each manufacturer. Therefore, there is no common standard for the digital format at present.

Generally used MPEG-2 or MPEG-4 is the file format in which the pieces of data are compressed. Since the data is degraded due to the compression, the MPEG-2 or MPEG-4 is not preferable to the common file. In the case where the non-compressed digital data shared simply is created, since the transfer rate is about 700 Mbps in the high-definition image, a time more than the actual time of the image is required for write and read. Therefore, it is less sufficient than the real-time tape and is unrealistic.

Currently, in order to solve these problems, the edited image is returned to the digital tape and then read by another editing apparatus again to share the image. Therefore, since the actual time of the image is required to read and write the digital tape, shortening a turn around time becomes the significant problem in the image editing.

Also, with respect to the data sending apparatus, the data loss in sending data leads to frame dropping and image turbulence, which results in a broadcasting accident. Therefore, the data loss in sending data is absolutely unacceptable. Therefore, expensive facility investment, for example, a semiconductor disk used for the data of the sending apparatus is required in the current system. Further, the problems are also left in the case of providing the sending apparatus in each editing apparatus in order to maintain compatibility with the editing apparatus. Also, as shown in the well-known examples, because the storage apparatus in which the digital image data is stored is independent of the sensing apparatus, a medium is required for the data transfer between the storage apparatus and the sending apparatus.

In view of the foregoing, an object of the present invention is to provide a storage system in which the individual digital image editing apparatus can handle the editing storage shared with the plural digital image editing apparatuses as the dedicated editing storage in the digital broadcasting system.

Another object of the present invention is to provide a storage system, in which the editing storage connected to the plural digital image editing apparatuses can be managed as a virtual storage in a collective manner and the editing storage connected to other digital image editing apparatuses can be handled as the editing storage connected to that digital image editing apparatus.

Another object of the present invention is to stably provide an image material stored in the editing storage from the same storage to the broadcasting sending apparatus.

Another object of the present invention is to provide a storage system in which the sharing of digital image material can be made in a time shorter than the actual time of the image by handling the digital image material to be shared which is created by the different plural digital image editing apparatuses as divided virtual tape in the storage apparatus.

The typical ones of the inventions disclosed in this application will be briefly described as follows.

A storage system according to the present invention comprises: an editing storage to which a digital data editing apparatus is connected and in which the digital data edited by the digital data editing apparatus is stored; and a management storage to which the editing storage is connected and which internally defines the editing storage as a virtual storage, wherein a first access path from the digital data editing apparatus to the editing storage and a second access path from the digital data editing apparatus through the virtual storage in the management storage are provided as access paths to the digital data stored in the editing storage, and the access through the first access path and the second access path is controlled based on a state of use of the editing storage.

Also, a digital broadcasting system comprises: a digital image editing apparatus which edits broadcasting digital image data; a storage system which includes an editing storage to which the digital image editing apparatus is connected and in which the digital image data edited by the digital image editing apparatus is stored, and a management storage to which the editing storage is connected and which internally defines the editing storage as a virtual storage; and a sending apparatus which sends the digital image data stored in the management storage as a broadcasting wave, wherein a first access path from the digital image editing apparatus to the editing storage and a second access path from the digital image editing apparatus through the virtual storage in the management storage are provided as access paths to the digital image data stored in the editing storage, and the access through the first access path and the second access path is controlled based on a state of use of the editing storage.

More specifically, the hardware configuration thereof includes a digital broadcasting facility having a digital image editing apparatus and editing storage apparatus in which the digital image data is stored, and a management storage apparatus which can handle the editing storage of the plural digital broadcasting facilities as a virtual storage. As described in the well-known technology, a small-scale digital editing system, in which the editing storage is shared with one or plural digital image editing apparatuses in the SAN environment of the fiber channel connection, is known as one example of the file sharing.

For example, the small-scale digital editing system is formed in the same floor, and the plural small-scale digital editing systems are provided. Also, a management storage, which handles the editing storage connected to each of the plural small-scale digital editing systems as the virtual storage, is provided. The editing storage connected to each of the plural digital image editing apparatuses can be handled as the virtual storage on the management storage. Thus, the data on the storage apparatus of the separate digital image editing apparatuses can be managed on the management storage in a collective manner.

In the virtual storage of an external storage which is of the conventional technology, when the virtual storage is accessed, the access is made through the management storage as if the management storage disk is accessed.

In this case, the access is made through a cache of the management storage, and the management storage and the virtual storage are connected by the fiber channel, IP, or other interfaces. Therefore, sometimes data I/O between the management storage and the virtual storage does not satisfy the high-speed performance due to line delay and the like.

Therefore, in the present invention, the digital image editing apparatuses can share the interface such as the fiber channel directly connected to the editing storage and a logical volume of the editing storage apparatus accessed through the interface as the virtual storage. In the case of being handled as the virtual storage, two access paths are provided between the digital image editing apparatus and the management storage through the fiber channel, the IP channel, and the like. By doing so, the file sharing can be achieved in the editing storage and the management storage.

In this case, when the logical volume data is simultaneously accessed from the digital image editing apparatus through the two paths, the data is broken as a natural result. Therefore, in order to solve the problem, the exclusive process is provided in which first-reading has a higher priority. As described above, the digital image editing apparatus handles the editing storage through the high-speed interface as if the editing storage is the dedicated storage thereof by providing the two access paths and by performing the exclusive process. Further, a manager can manage all the related storages as if the storages are the dedicated storages thereof.

Also, the technology is provided, in which the logical volume is divided into a primary and a secondary and managed on the editing storage and the exclusive process can be realized based on a synchronous/asynchronous transition between the primary and the secondary by sharing the secondary as the virtual storage.

Further, since the management storage can manage the data in a collective manner and a data conversion process is performed in the same storage, the data sharing and the data transfer to the sending apparatus can be realized without any transfer medium. Also, the logical volumes in the editing storages of other digital image editing apparatuses can be accessed through the management storage by providing the virtual storage. Therefore, the environment in which the data is commonly used can be provided. Further, for the editing apparatus and the storage in the remote site which are of the problem in the conventional technology, the remote storage can be connected through an extender and the remote storage can be used as the virtual storage through the extender, and it is possible to share the remote storage. Since the digital image editing apparatus which performs the actual editing and the editing storage which is actually used are close to each other, the problem of the line distance is eliminated.

The effect obtained by the representative one of the inventions disclosed in this application will be briefly described as follows.

(1) Because an image editor can use the editing storage in the directly connected environment, satisfactory performance can be obtained in the data transfer.

(2) The digital image data which is present in the editing storage connected to other digital image editing apparatuses through the virtual storage can also be used through the network.

(3) The digital image data manager can handle the data on all the connected editing storages as the virtual storage in a collective manner, and the management efficiency can be remarkably improved and the data can be released to the editor as the library on the virtual storage.

(4) The digital image data can be referred from the plural systems. However, there is actually only one digital image data, and the problem of the duplicated management of the data resulting from the data copies can be solved and the total amount of disk capacity can be decreased.

(5) The connection of the virtual storage is not limited to SAN, and since the storage in the remote site can be used as the virtual storage by utilizing the extender and the like, the image sharing can be achieved in the wide range environment.

(6) The data transfer between the different editing apparatuses can be performed within the same storage in a time shorter than the actual time of the image by using the virtual tape technology and the divided writing and reading.

(7) When sending the digital image data, the copy is created in the storage and directly provided to the sending apparatus through clustering connection. Therefore, cost of the data transfer can be reduced and the reliability can be secured.

BRIEF DESCRIPTIONS OF THE DRAWINGS

FIG. 5 is an explanatory diagram for explaining a state transition of the logical volume and an access right of the virtual storage in the storage system according to an embodiment of the present invention;

FIG. 6 is an explanatory diagram for explaining a comparative example of using the tape.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

(Configuration of Storage System)

Figure 1:
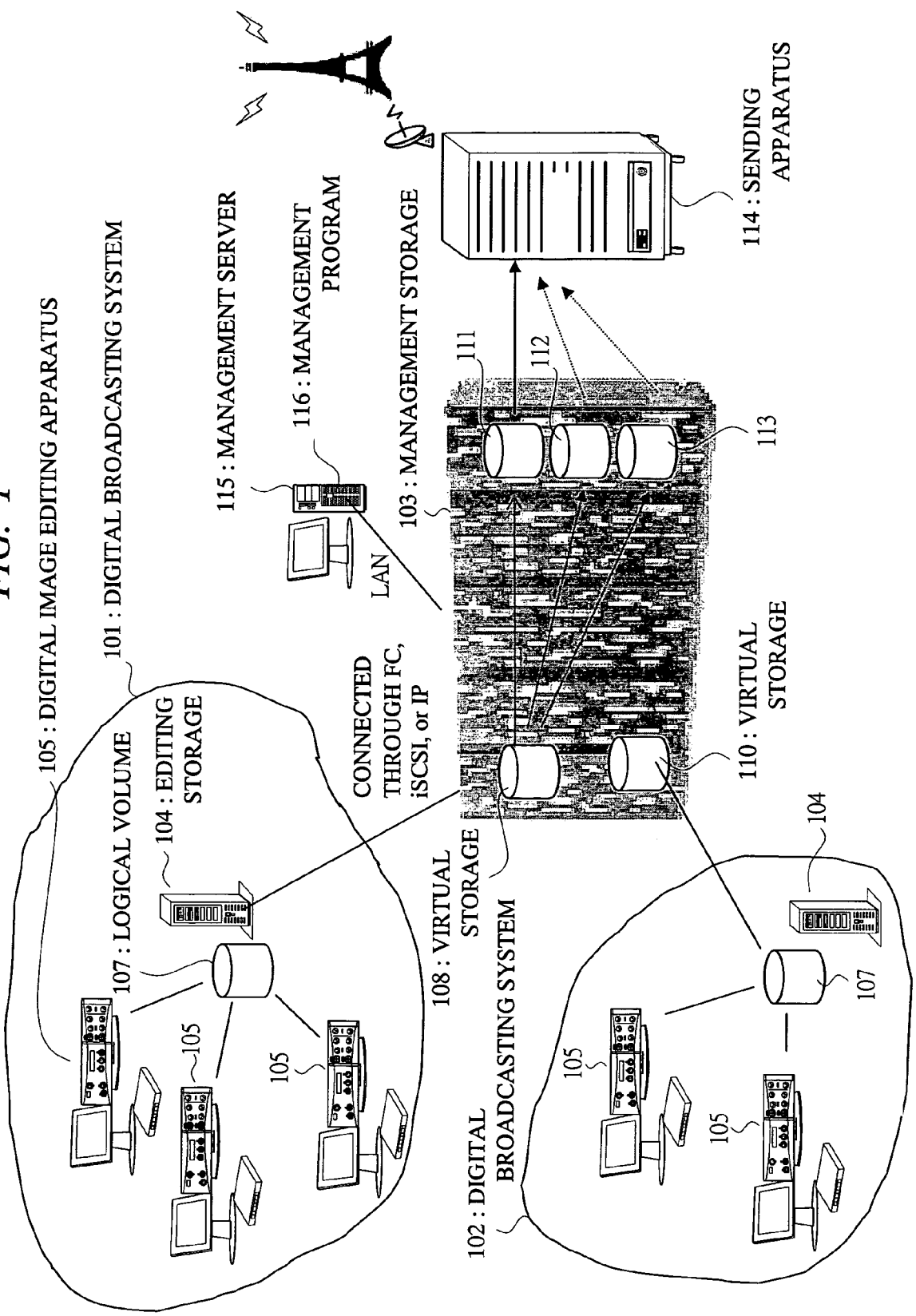
FIG. 1 is a block diagram showing the configuration of a storage system according to an embodiment of the present invention.

The configuration of a storage system according to an embodiment of the present invention will be described with reference to FIG. 1. FIG. 1 is a block diagram showing the configuration of the storage system according to the embodiment of the present invention, and FIG. 1 shows the configuration in which the storage system is used for the editing storage and the management storage in the digital broadcasting system.

In FIG. 1, the storage system includes editing storages 104 and a management storage 103. The editing storage 104 is connected to plural digital image editing apparatuses 105 through an interface such as the fiber channel, SCSI, and iSCSI. The management storage 103 manages the editing storages 104 as the external connection storage.

Small-scale digital broadcasting systems 101 and 102 are formed of the plural digital image editing apparatuses 105 and the plural editing storages 104. In this case, each of the digital broadcasting systems 101 and 102 includes the plural digital image editing apparatuses 105. However, it is possible that the digital broadcasting system includes one digital image editing apparatus 105. Many digital broadcasting systems as described above are used even at present.

Also, the digital image data is sent from the management storage 103 to a sending apparatus 114 in the form of a broadcasting signal.

A logical volume 107 of the editing storage 104 performs an exclusive process with an original exclusive process program during the editing from the digital image editing apparatus 105. The data is shared among the plural digital image editing apparatuses 105 connected to the editing storage 104.

The logical volume 107 of the editing storage 104 is connected to the management storage 103 which can use the external connection storage as the virtual storage. The logical volume 107 of the editing storage 104 is defined as virtual storages 108 and 110 on the management storage 103.

The control as described above is made by the management program 116 for controlling the virtual storage. The management program 116 is operated on a management server 115 such as a service processor which manages the management storage 103. The virtual storage technology is reported in Japanese Patent Laid-Open Publication No. 2001-313620 and others.

The digital image editing apparatuses 105 of the small-scale digital broadcasting systems 101 and 102 can be directly connected to the management storage 103 respectively. Each digital image editing apparatus 105 can access the external connection storage managed on the management storage 103.

In the configuration described above, an image editor can use the editing storage 104 through the directly-connected interface as if the editing storage 104 is the private storage of the image editor, and a manager who manages materials can manage the data on the management storage 103 in a collective manner.

(Access Path to Logical Volume on Editing Storage)

Figure 2:
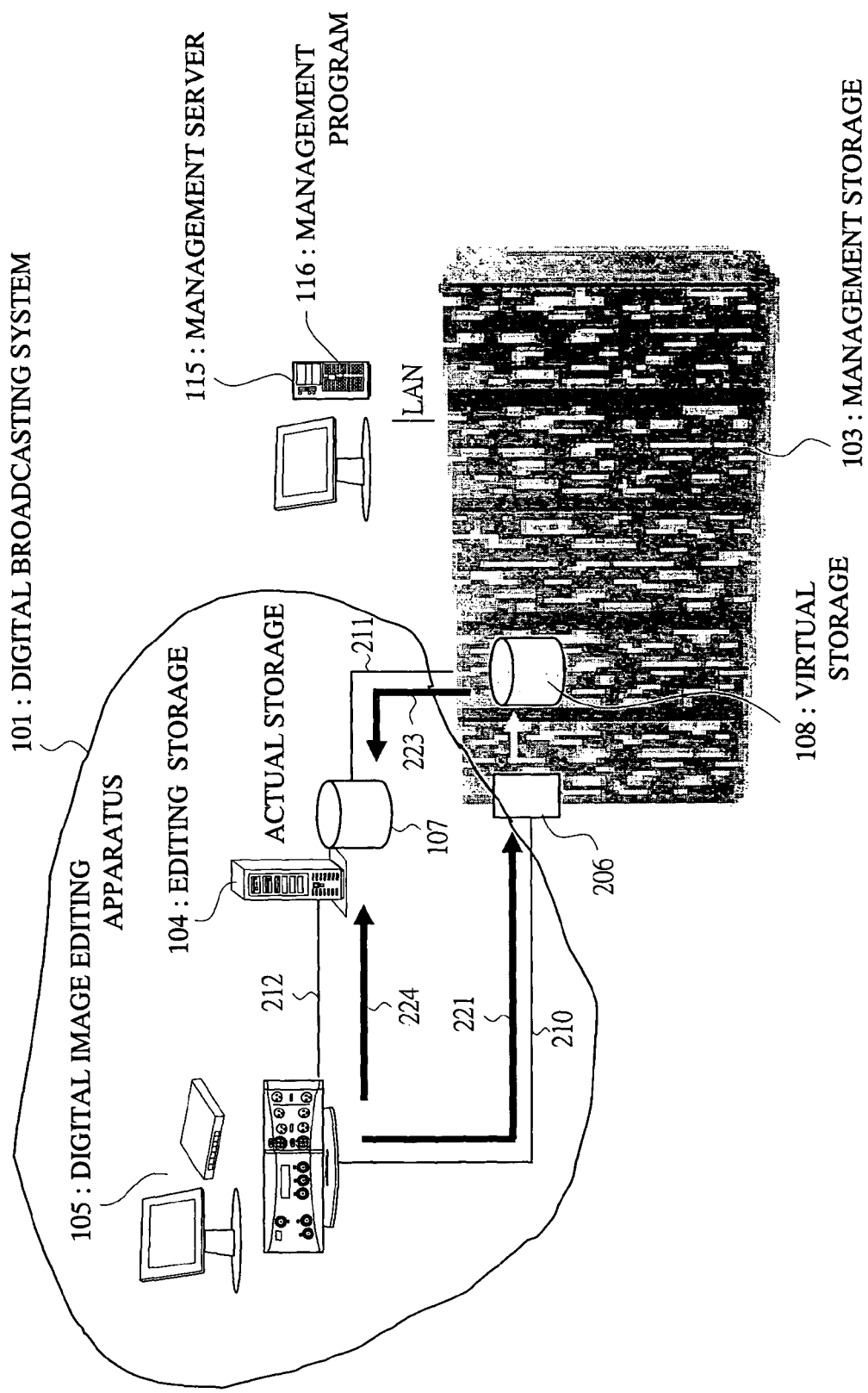
FIG. 2 is an explanatory diagram for explaining an access path to a logical volume on an editing storage in the storage system according to an embodiment of the present invention.
Figure 3:
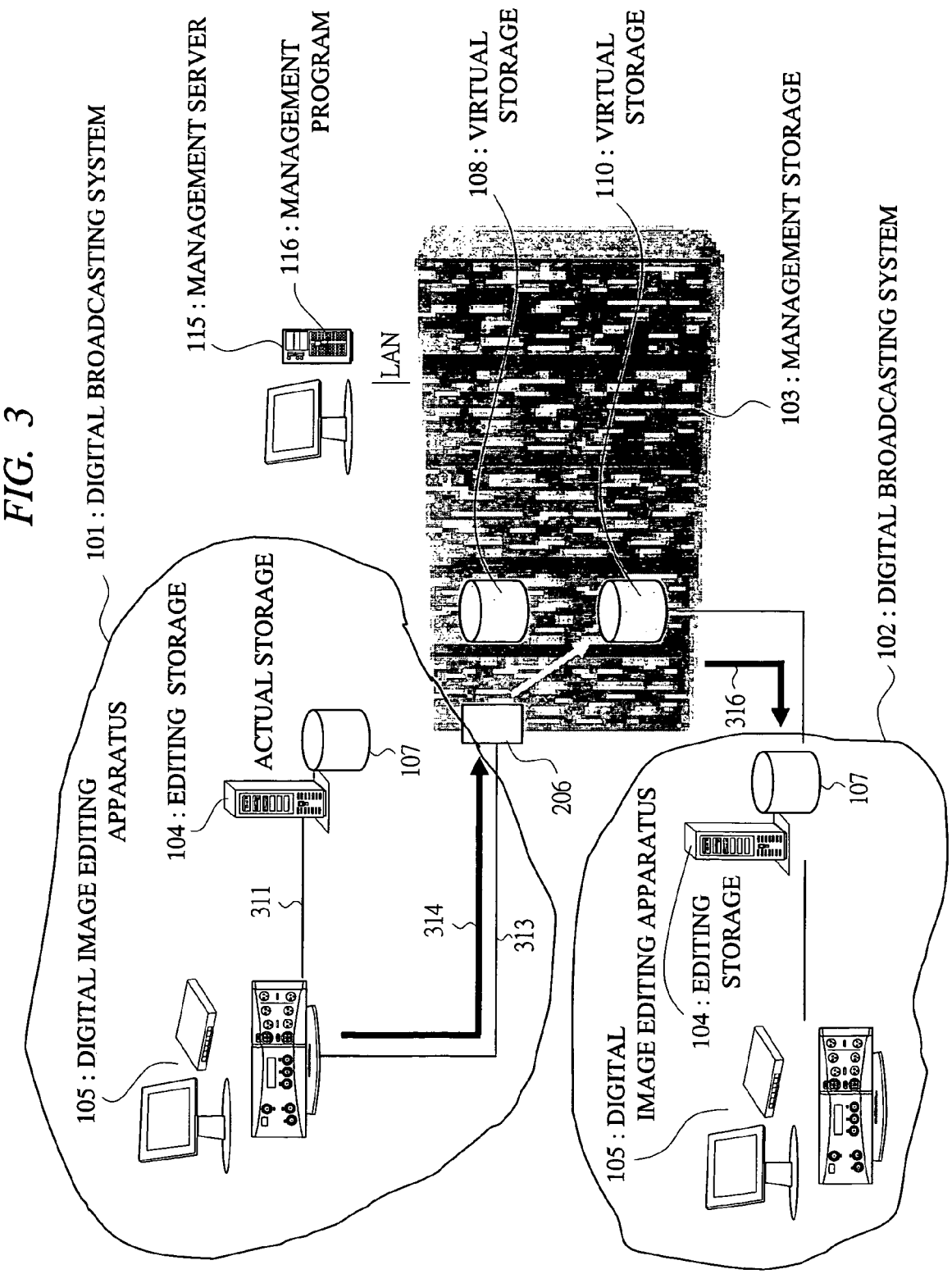
FIG. 3 is an explanatory diagram for explaining the access path to the logical volume on the editing storage in the storage system according to an embodiment of the present invention.

Next, an access path to the logical volume on the editing storage in the storage system according to an embodiment of the present invention will be described below with reference to FIGS. 2 and 3. FIGS. 2 and 3 are explanatory diagrams for explaining the access path to the logical volume on the editing storage in the storage system according to an embodiment of the present invention. FIG. 2 shows the case in which the access is made from the digital image editing apparatus 105 to the logical volume 107 of the editing storage 104 connected to the digital image editing apparatus 105. FIG. 3 shows the case in which the access is made from the digital image editing apparatus 105 to the logical volume 107 of the editing storage 104 other than the editing storage 104 to which the digital image editing apparatus 105 is connected.

When the editing operation is performed with the digital image editing apparatus 105 in the small-scale digital broadcasting system 101, the digital image editing apparatus 105 is connected to the editing storage 104 through a directly-connected interface 212 (for example, fiber channel), and the digital image editing apparatus 105 accesses the logical volume 107 defined there. In FIG. 2, the reference numeral 224 denotes this path.

Next, as another access path, the editing storage 104 is connected to the management storage 103 as the external connection storage through fiber channel or the like, and the logical volume 107 is handled as a virtual storage 108 on the management storage.

As the path through which the digital image editing apparatus 105 accesses the logical volume 107, the digital image editing apparatus 105 is connected to the management storage 103 through fiber channel or the like. The digital image editing apparatus 105 accesses the virtual storage 108 through the path and a cache 206 of the management storage 103. The virtual storage 108 is actually the logical volume 107, and the virtual storage 108 actually accesses the data through a path 211.

As described above, the logical volume 107 of the editing storage 104 can be accessed through two paths.

Also, as the path through which the digital image editing apparatus 105 of the small-scale digital broadcasting system 101 accesses the logical volume 107 of the editing storage 104 directly connected to the digital image editing apparatus 105 of the small-scale digital broadcasting system 102 in which the logical volume 107 servers as the virtual storage 110 of the management storage 103, as shown in FIG. 3, the digital image editing apparatus 105 of the small-scale digital broadcasting system 101 can access the virtual storage 110 defined on the management storage 103 through a path 313 and the cache 206 of the management storage 103. This actually means that the logical volume 107 of the editing storage 104 in the small-scale digital broadcasting system 101 is accessed.

Namely, all the logical volumes 107 of the editing storages 104 can be shared with the digital image editing apparatus 105 connected to the management storage 103 by defining the logical volume of the digital image editing apparatus 105 on the management storage 103 as the virtual storages 108 and 110.

(Definition of Virtual Storage)

Figure 4:
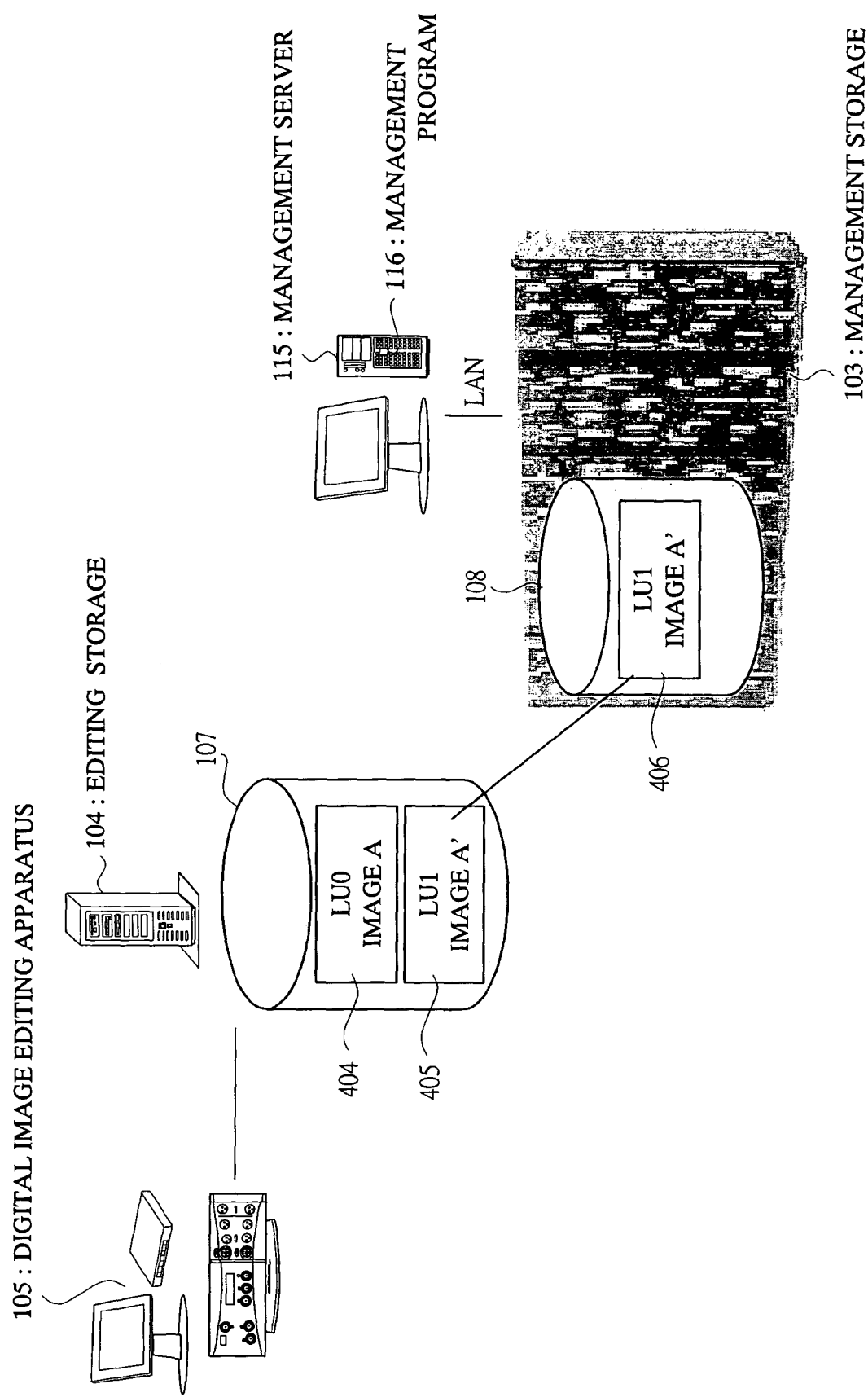
FIG. 4 is an explanatory diagram for explaining a definition of a virtual storage in the storage system according to an embodiment of the present invention.

Next, the definition of the virtual storage of the storage system according to an embodiment of the present invention will be described below with reference to FIGS. 4 and 5. FIG. 4 is an explanatory diagram for explaining the definition of the virtual storage in the storage system according to an embodiment of the present invention, and FIG. 4 shows an example how the logical volume on the editing storage is defined as the virtual storage on the management storage. FIG. 5 is an explanatory diagram for explaining a state transition of the logical volume and an access right of the virtual storage in the storage system according to an embodiment of the present invention.

The example shown in FIG. 4 is the novel technology for solving the problems in the data exclusive process. For example, a primary LU (Logical Unit) is defined as LU for editing the image.

For example, a secondary (sub-volume) LU is created for the LU by utilizing an LU copying function. In the example shown in FIG. 4, the primary LU is set at LU0 (404) and the secondary LU is set at LU1 (405).

On the management storage 103, only the secondary LU1 (405) is defined as LU1 (406) on the virtual storage 108. There are a synchronous state and an asynchronous state between LU0 (404) and LU1 (405), and LU0 (404) and LU1 (405) can be re-synchronized with each other. At this point, contents of the primary can be synchronized with the secondary, or the status of the secondary can be returned to the primary. In the access to LU1 (405) from LU1 (406) of the virtual storage 108, the access right is controlled depending on the states of LU0 (404) and LU1 (405).

The states and the state transition described above can be monitored and controlled by GUI of the management program 116 or by GUI operated on the editing apparatus.

As shown in FIG. 5, with respect to the state transition of the logical volume and the access right of the virtual storage, for example, when performing the editing operation to LU0 (404), LU0 (404) is in the editing state and LU1 (405) is in the synchronous state or the asynchronous state.

In the case where LU1 (405) is in the synchronous state, the contents of LU1 (405) are updated at any time. Therefore, the access from the LU1 (406) side of the virtual storage 108 is limited to the Read only (only reference). In a safety site, even the Read may be set NG.

When an editor intends to put the editing result public to others while temporarily suspending the editing, for example, LU1 (405) is temporarily set at a split state (asynchronous state).

Then, since the data is frozen at that point in LU1 (405), LU1 (405) can be accessed as LU1 (406) of the virtual storage 108 on the management storage 103 regardless of whether LU0 (404) is in the editing state or the non-editing state.

In this case, the editing such as write can be performed to LU1 (405). The editor can provide the result to other users at any time while continuing the operation by separating LU0 (404) and LU1 (405) from each other on a half way of the editing.

When the data editing is performed to LU1 (406) on the virtual storage 108, the result thereof can be realized by performing the synchronizing process to return it from LU1 (405) to LU0 (404).

Also, the state transition or the access right of LU on the storages is displayed by an image editing storage manager or the like, and the access is controlled by the right. By doing so, the exclusive process can be performed.

Image editing storage manager can also be referred from the management program 116 in synchronization with the management program 116 of the management storage 103. Further, the image editing storage manager can be displayed by the GUI tool on the digital image editing apparatus 105.

Since the editing storage 104 and the management storage 103 are available as long as the virtual storages 108 and 110 can be formed between the editing storage 104 and the management storage 103, the system can be realized by utilizing an extender and a public line even if the editing storage 104 or the management storage 103 is located at a remote site. Consequently, it is possible to solve the problem of the restriction on the distance unique to the fiber channel.

In the description of this embodiment, the function of the virtual storage is used. However, in the technology in which the primary and the secondary hold the LU and the secondary is shared, the similar effect can be obtained by the same idea and application. For example, a primary disk is set at the built-in disk of the digital image editing apparatus 105 or at the corresponding storage, e.g. the editing storage 104 shown in FIG. 1, and the secondary is defined on the storage connected by IP. By doing so, it is possible to obtain the similar effect. In this case, it is difficult to perform the remote synchronizing process by the remote operation of IP. Therefore, the synchronization (logical) based on the asynchronization (temporal) is preferable. If the technological problem of the line speed can be solved in the future, the complete synchronization can be achieved.

In addition, the similar technology can be realized by creating the primary on the fiber channel and by creating the secondary on NAS.

Thus, in this embodiment, even if the logical volume 107 of the editing storage 104 is shared with the two paths, the logical volume 107 can be shared without causing the problems that the data is broken by the simultaneous access to the data, the data cannot be referred during the editing due to the exclusive process performed simply, and the access cannot be made through the directly-connected digital image editing apparatus 105 when the editing is performed through the management storage 103.

(Sending Operation of Digital Image Data)

Next, the sending operation of the digital image data of the storage system according to an embodiment of the present invention will be described below with reference to FIG. 1.

As shown in FIG. 1, the management storage 103 is connected to the sending apparatus 114 to send the digital image data. As the technology in which the digital image data is provided from the management storage 103 to the sending apparatus 114, the plural LUs (for example, 111, 112, and 113) in which the data to be sent is stored are created, and the plural LUs (111, 112, and 113) are connected to the sending apparatus 114 by clustering.

The management storage 103 is connected to the sending apparatus 114 through the plural paths by the clustering, the clustered paths are connected to the copied LUs, and the data is simultaneously provided from the plural LUs through the plural paths. Therefore, the data can be provided stably.

Accordingly, the process of sending the digital image data can be performed by the management storage 103 without using the dedicated apparatus in which the semiconductor disk and the like are used, and all the storage operations can be completed within the management storage 103 in the digital broadcasting system.

(Data Exchange Between Different Digital Image Editing Apparatuses)

Figure 7:
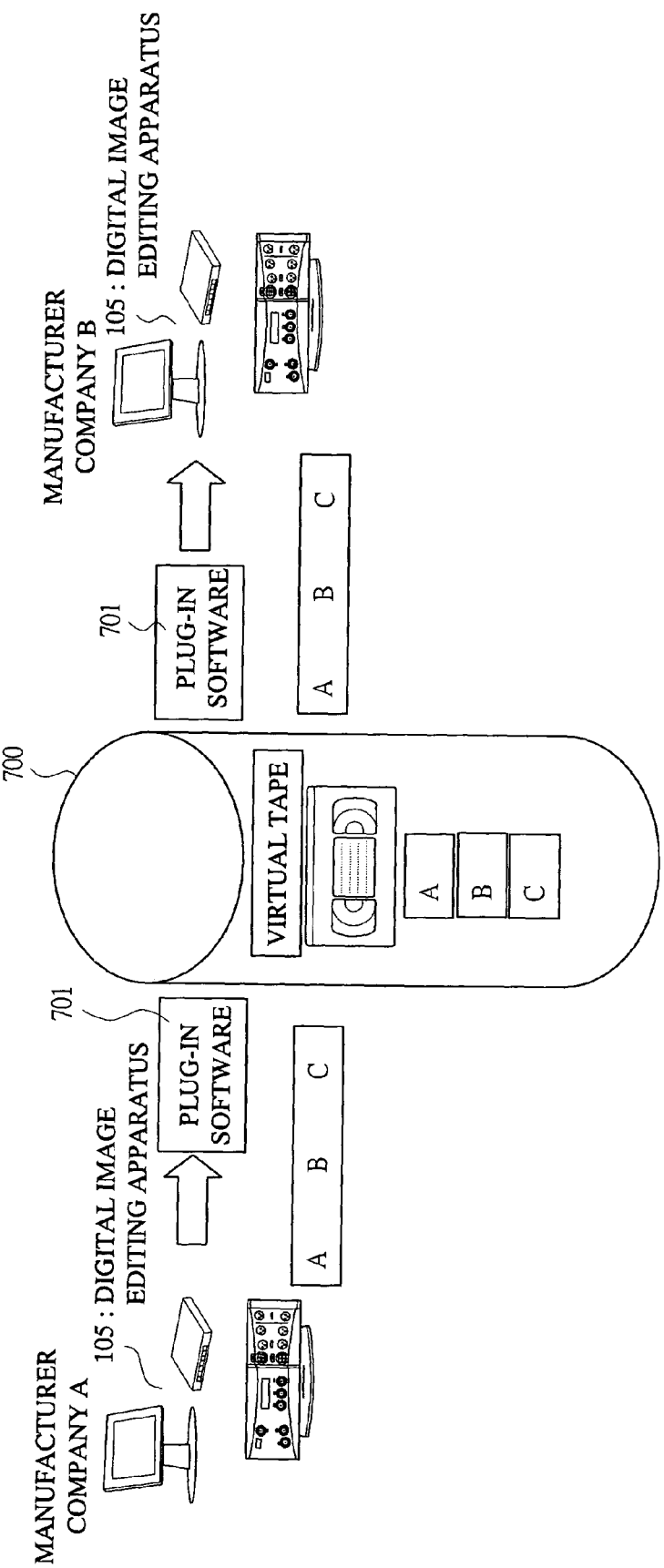
FIG. 7 is an explanatory diagram for explaining data exchange between different digital image editing apparatuses in the storage system according to an embodiment of the present invention.

Next, the data exchange between the different digital image editing apparatuses in the storage system according to an embodiment of the present invention will be described below with reference to FIGS. 6 and 7. FIG. 6 is an explanatory diagram for explaining a comparative example of using the tape. FIG. 7 is an explanatory diagram for explaining the data exchange between the different digital image editing apparatuses in the storage system according to the embodiment of the present invention.

FIG. 6 shows the state in which the digital image data is exchanged between the digital image editing apparatus 105 of a manufacturer company A and the digital image editing apparatus 105 of a manufacturer company B through digital tape 600.

FIG. 7 shows the state in which the digital image data is exchanged between the digital image editing apparatus 105 of the manufacturer company A and the digital image editing apparatus 105 of the manufacturer company B through virtual tape 700 on the management storage 103.

Usually, each manufacturer of the digital image editing apparatus 105 uses the original digital data format in order to improve an editing speed. Therefore, in the broadcasting industry in which the plural digital image editing apparatuses are handled, when sharing the editing work and transferring the data with the different digital image editing apparatuses, the data is exchanged by writing the data in the digital tape 600 which becomes the common interface in order to maintain data compatibility.

The problem in this case is that the tape requires the actual time of the image, and the time twice as long as the actual time of the image is required for performing both the write operation and the read operation.

Therefore, in this embodiment, the digital image data is exchanged by using the virtual tape storage technology which is represented by virtual tape libraries such as MT.

The technology for emulating the tape on the storage can be realized by creating the plug-in software 701 similar to that in the conventional technology. However, in a high-definition image, a transfer rate of the digital data becomes as high as 700 Mbps, and the transfer time of this data amount becomes more than the actual time. In this embodiment, however, the digital image data to be written is divided into the specified number of pieces or divided by the specified capacity and time (for example, pieces of data A, B, and C shown in FIG. 7), and then, the digital image data is transferred to the plug-in software 701 in a multiplex manner. Therefore, the write emulation on the storage can be performed less than the actual time. It is preferable that the division information is added to the top of the digital image data.

In the read operation, the plural pieces of data on the storage are sequentially read based on the division information provided at the top thereof. Further, the read time can be shortened by simultaneously reading the plural images and combining the plural images on the digital image editing apparatus side.

Also, the virtual tape 700 is created on the logical volume 107 of the editing storage 104, and the virtual tape 700 is defined as the virtual storage on the management storage 103. Therefore, the virtual tap 700 can be accessed from the different digital image editing apparatuses 105.

Further, in the logical volume 107 of the editing storage 104, by creating an internal editing area and an area for the virtual tape 700, the data in the internal editing area is used when the editor uses the digital image editing apparatus 105 connected to the editing storage 104, and the data in the virtual tape 700 is used when the editor uses the different digital image editing apparatus 105 in which the different digital format is used. Therefore, the editing speed can be improved when the editing is performed by the digital image editing apparatus 105 connected to the editing storage 104.

Also, it is also possible to convert the data in the virtual storages 108 and 110 on the management storage 103 into the data for the virtual tape 700 by using the plug-in software 701 without changing the logical volume 107 of the editing storage 104. In this case, when the dame digital format is used without changing the configuration of the editing storage 104, the data in the virtual storages 108 and 110 is accessed, and when the different digital format is used, the virtual tape 700 is accessed. By doing so, the digital image data can be shared with the digital image editing apparatuses 105 in which the different digital formats are used.

According to the technology described above, the mutual use of the data and the data sharing with the different digital image editing apparatuses can be realized on the storage. Also, since the use of the plug-in technology eliminates the change on the digital image editing apparatus side, it is possible to utilize the existing facility without any modification.

In the foregoing, the invention made by the inventor of the present invention has been concretely described based on the embodiments. However, it is needless to say that the present invention is not limited to the foregoing embodiments and various modifications and alterations can be made within the scope of the present invention.

The application in the above-described NAS system can be cited as an example.

Also, in this embodiment, the case where the storage system is applied to the digital broadcasting system has been described. However, the application of the storage system is not limited to the digital broadcasting system. The storage system can also be applied to the system in which the storage apparatus is used as the external connection storage and the data of the storage apparatus connected externally is also accessed by the digital data editing apparatus or the like.

The present invention relates to the technology of the storage system, and the present invention is particularly effective when applied to the digital broadcasting system and the NAS system using the storage system.

What is claimed is:

1. A storage system comprising:
   a first plurality of digital data editing apparatuses;
   a first editing storage to which said first plurality of digital data editing apparatuses are coupled via fiber channel network, wherein the first editing storage provides a first logical volume and a second logical volume, said first logical volume stores digital data edited by said first plurality of digital data editing apparatuses, said second logical volume stores a backup data of a digital data of said first logical volume;
   a second plurality of digital data editing apparatuses;
   a second editing storage to which said second plurality of digital data editing apparatuses are coupled via fiber channel network, wherein the second editing storage provides a third logical volume and a fourth logical volume, said third logical volume stores digital data edited by said second plurality of digital data editing apparatuses, said fourth logical volume stores a backup data of a digital data of said third logical volume;
   a management storage to which said first plurality of digital data editing apparatuses, said first editing storage, said second plurality of digital data editing apparatuses, and said second editing storage are coupled via IP network, wherein the management storage maps said second logical volume of said first editing storage and said fourth logical volume of said second editing storage to a first virtual volume and a second virtual volume of said management storage, respectively; and
   a management server which manages said second logical volume of said first editing storage and said fourth logical volume of said second editing storage as said first virtual volume and said second virtual volume of said management storage, respectively,
   wherein said storage system has a first access path with which said first plurality of digital data editing apparatuses access said first logical volume via fiber channel network, a second access path with which said management server and said first plurality of digital data editing apparatuses and said second plurality of digital data editing apparatuses access said second logical volume via a cache memory of said management server and said first virtual volume, a third access path with which said second plurality of digital data editing apparatuses access said third logical volume via fiber channel network, a fourth access path with which said management server and said first plurality of digital data editing apparatuses and said second plurality of digital data editing apparatuses access said fourth logical volume via a cache memory of said management server and said second virtual volume.

2. The storage system according to claim 1,
   wherein said first logical volume and said second logical volume form a first copy pair in which said first logical volume is defined as a primary volume directly accessed by said first plurality of digital data editing apparatuses and said second logical volume is defined as a secondary volume,
   wherein said third logical volume and said fourth logical volume form a second copy pair in which said third logical volume is defined as a primary volume directly accessed by said second plurality of digital data editing apparatuses and said fourth logical volume is defined as a secondary volume.

3. The storage system according to claim 2,
   wherein there are a synchronous state and an asynchronous state between said first logical volume and said second logical volume, and an access right of said second logical volume as the first virtual volume on said management storage is controlled based on an editing status of said first logical volume and information of said synchronous state or said asynchronous state.

4. The storage system according to claim 3,
   wherein control of said access right and reference to a control status of said access right are performed with a virtual storage management GUI tool operated on said management storage and managing said first virtual volume and said second virtual volume, or with an access right status management GUI tool operated on one of the plurality of first digital data editing apparatuses, which is operated in synchronization with said virtual storage management GUI tool.

5. The storage system according to claim 1,
   wherein said first virtual volume stores said digital data as a common digital format which can be used by each of said first plurality of digital data editing apparatuses, said digital data being edited by said first plurality of digital data editing apparatuses each of which having different digital formats.

6. The storage system according to claim 5,
wherein said digital data edited by said first plurality of digital data editing apparatuses is divided into a plurality of pieces and then stored in said first virtual volume.

7. The storage system according to claim 1,
wherein said management storage creates a plurality of copies of said digital data on said management storage and provides said plurality of digital data through a path connected by clustering, when providing said digital data to a sending apparatus which sends said digital data.

* * * * *